US006160609A

United States Patent [19]

Inoue

[11] Patent Number: 6,160,609

[45] Date of Patent: Dec. 12, 2000

[54] PRINTING PAPER INFORMATION READING APPARATUS

[75] Inventor: Takatoshi Inoue, Wakayama, Japan

[73] Assignee: Noritsu Koki Co. Ltd., Osaka, Japan

[21] Appl. No.: 08/923,437

[22] Filed: Sep. 4, 1997

[30] Foreign Application Priority Data

Sep. 13, 1996 [JP] Japan .................................... 8-243064

[51] Int. Cl.[7] ............................ G03B 27/52; G03B 17/24

[52] U.S. Cl. .................................. 355/41; 355/29; 83/371

[58] Field of Search .................................. 355/27, 28, 40, 355/41, 38, 29; 396/311, 570; 83/371

[56] References Cited

U.S. PATENT DOCUMENTS

| | | | |
|---|---|---|---|
| 3,868,877 | 3/1975 | Shoji et al. | 83/210 |
| 3,948,125 | 4/1976 | Hujer et al. | 83/62 |
| 3,992,965 | 11/1976 | Hell et al. | 83/27 |
| 4,140,390 | 2/1979 | Schulltheis et al. | 355/29 |
| 5,072,639 | 12/1991 | Dolf | 83/371 |
| 5,093,684 | 3/1992 | Crochetierre et al. | 355/40 |
| 5,583,610 | 12/1996 | Yoshikawa | 355/40 |

FOREIGN PATENT DOCUMENTS

| | | | |
|---|---|---|---|
| 517661 | 12/1992 | European Pat. Off. | G03D 15/04 |
| 246451 | 2/1990 | Japan . | |
| 63197472 | 2/1990 | Japan | G03C 11/00 |

*Primary Examiner*—Alan A. Mathews
*Attorney, Agent, or Firm*—Fulbright & Jaworski, LLP

[57] ABSTRACT

A printing paper information reading apparatus for accurately detecting cut marks 3*a* and reading information formed on printing paper 3. The apparatus includes a first mark detector 29*a* for detecting the cut marks 3*a* formed for frame images printed on the printing paper 3, respectively, a second mark detector 29*b* for detecting information marks 3*c* formed in the printing paper 3 in a corresponding relationship to the cut marks 3*a*, and a printing paper information generator 5*g* for generating printing paper information by evaluating results of detection of the information marks 3*c* by the second mark detector 29 in synchronism with detection of the cut marks 3*a* by the first mark detector 29*a*.

6 Claims, 11 Drawing Sheets

C.U.=CONTROL UNIT

PRINTING PAPER INFORMATION READING APPARATUS

BACKGROUND OF THE INVENTION

1. Field of the Invention

This invention relates to a printing paper information reading apparatus for reading information represented by marks formed for each frame image printed on printing paper.

2. Description of the Related Art

A printing paper information reading apparatus as noted above is known from Patent Publication Kokai No. H2-46451, for example. In this apparatus, printing paper having frame images includes cut marks printed along one of the opposite side edges of the paper to indicate positions to be cut to produce prints of the respective images. Information in the form of binary data is recorded in selected positions of the printing paper, which information is provided by a distribution of the cut marks to the opposite side edges to be detected by two optical sensors. Thus, the information in binary data is read while the printing paper is cut.

However, in this conventional printing paper information reading apparatus, the cut marks are detected by two optical sensors, i.e. a first optical sensor for detecting the cut marks printed along one side edge, and a second optical sensor for detecting the cut marks printed along the other side edge. A discrepancy in assembled position or detection characteristic between the two optical sensors would result in a displacement of cutting position for each print. In addition, the cut marks having to be printed along the two separate edges are a disadvantage in accurate positioning of the cut marks. This also results in a displacement of cutting position for each print.

With the photographic processing apparatus operable at increasingly high speed, printing paper transported at high speed must be cut with high precision. In view of such requirement, it is necessary to remove, as far as possible, instability factors of the conventional printing paper information reading apparatus relating to displacement of cutting positions for producing prints.

SUMMARY OF THE INVENTION

The object of this invention is to provide a printing paper information reading apparatus which overcome the disadvantage of the prior art, and which is capable of detecting cut marks accurately and reading information recorded on printing paper.

The above object is fulfilled, according to this invention, by a printing paper information reading apparatus comprising first mark detecting means for detecting cut marks formed for frame images printed on the printing paper, respectively, second mark detecting means for detecting information marks formed in the printing paper in a corresponding relationship to the cut marks, and printing paper information generating means for generating printing paper information by evaluating results of detection of the information marks by the second mark detecting means in synchronism with detection of the cut marks by the first mark detecting means.

In the printing paper information reading apparatus having the above construction, all of the cut marks formed in the printing paper are detected by the first mark detecting means, and all of the information marks formed in the printing paper are detected by the second mark detecting means. Information represented by a series of information marks is generated by evaluating results of detection of the information marks by the second mark detecting means in synchronism with detection of the cut marks by the first mark detecting means. When the printing paper is cut by using cut mark detection signals from the first mark detecting means, a reliable cut mark detection is achieved by the same mark detecting means to realize a high degree of cutting precision. Further, since the results of detection of the information marks are evaluated in synchronism with detection of the cut marks by the first mark detecting means, this is carried out while accurately grasping timing of occurrence of the information marks. This is advantageous where the printing paper includes frame images of ordinary size and panorama size having varied lengths in a direction of transport.

Where the printing paper has printing paper information in the form of a series of information marks arranged in a plurality of different areas in the direction of transport, it is necessary for the information generating means to recognize a starting point of the series of information marks. In one preferred embodiment of this invention, the printing paper includes leading marks each indicating a starting point of a series of the information marks. The information generation means can recognize a starting point of a series of information marks based on detection of each leading mark. Information often used as the printing paper information is an order number in the form of an ID code of each order area on the printing paper usually forming frame images of one negative film. Taking this fact into account, in a preferred embodiment this invention, the leading marks are order marks dividing the printing paper into units of orders.

In a preferred embodiment of this invention, the order marks are detected by the first mark detecting means. For this purpose, the order marks, preferably, are arranged in approximately the same positions as the cut marks transversely of the direction of transport, so that the first mark detecting means detect the cut marks and order marks at predetermined short intervals. Detection timing of the order marks need not be so accurate as detection timing of the cut marks. Thus, the first mark detecting means for detecting the cut marks may be used also for detecting the order marks, thereby to simplify the apparatus.

As a different embodiment of this invention, the order marks may of course be detected by the second mark detecting means. In this case, the order marks are arranged in the same positions as the information marks transversely of the direction of transport, so that the second mark detecting means detect the order marks as well as the information marks. Where each order mark is set to lead the information marks, the first detection may be determined to correspond to the order mark, and subsequent detections to the information marks. In this case also, the apparatus is simplified by using the second mark detecting means for detecting the order marks and information marks.

Considering limited areas of printing paper other than the frame image areas, and a space for arranging the first and second mark detecting means, it is preferable that the cut marks are formed along one side edge of the printing paper while the information marks are formed along the other, opposite side edge of the printing paper.

Other features and the advantages of this invention will be apparent from the following description of the embodiments to be taken with reference to the drawing.

DESCRIPTION OF THE PREFERRED EMBODIMENTS

Figure 1:
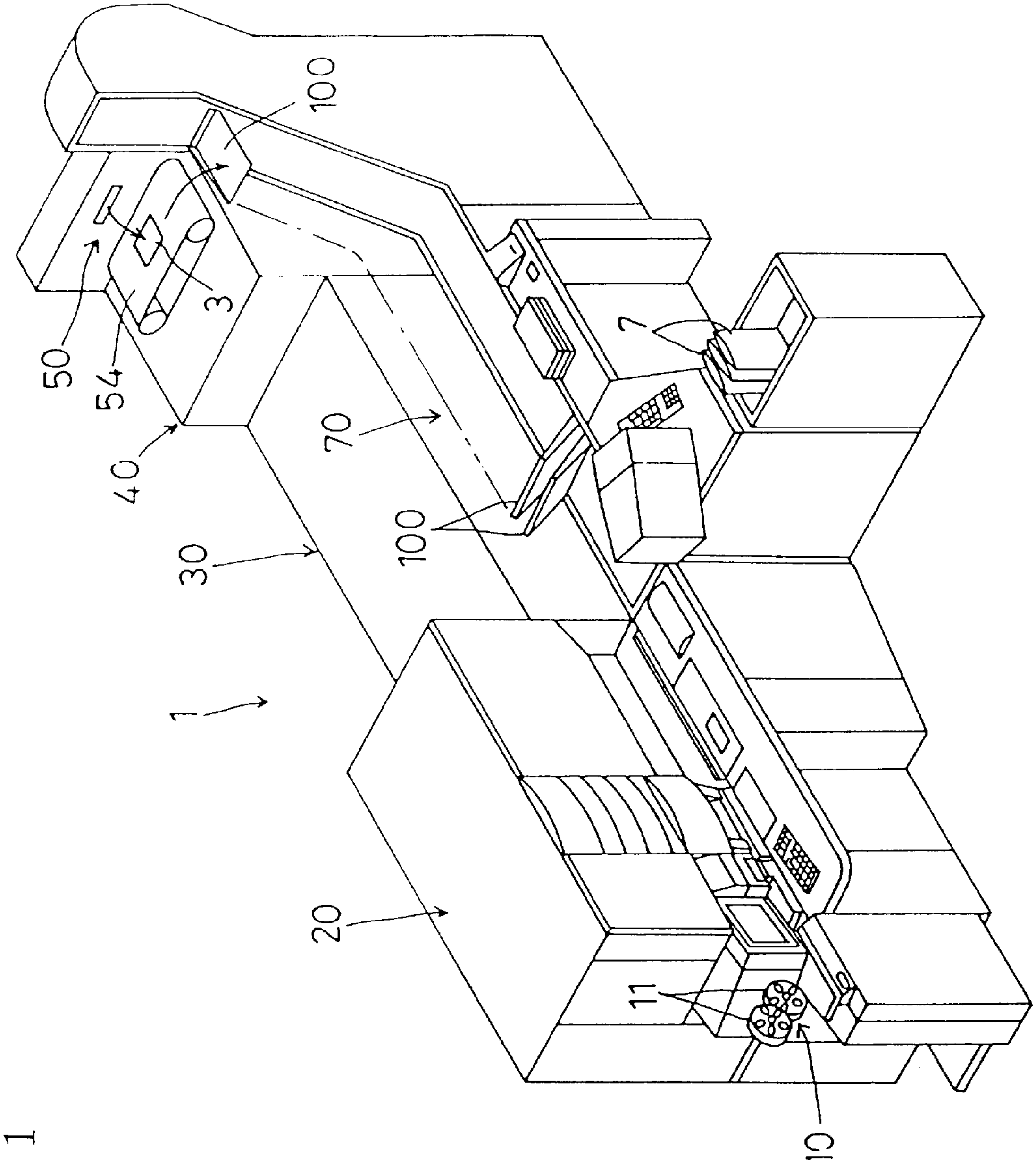
FIG. 1 is a perspective view of a photographic processing apparatus employing a printing paper information reading apparatus according to this invention.
Figure 2:
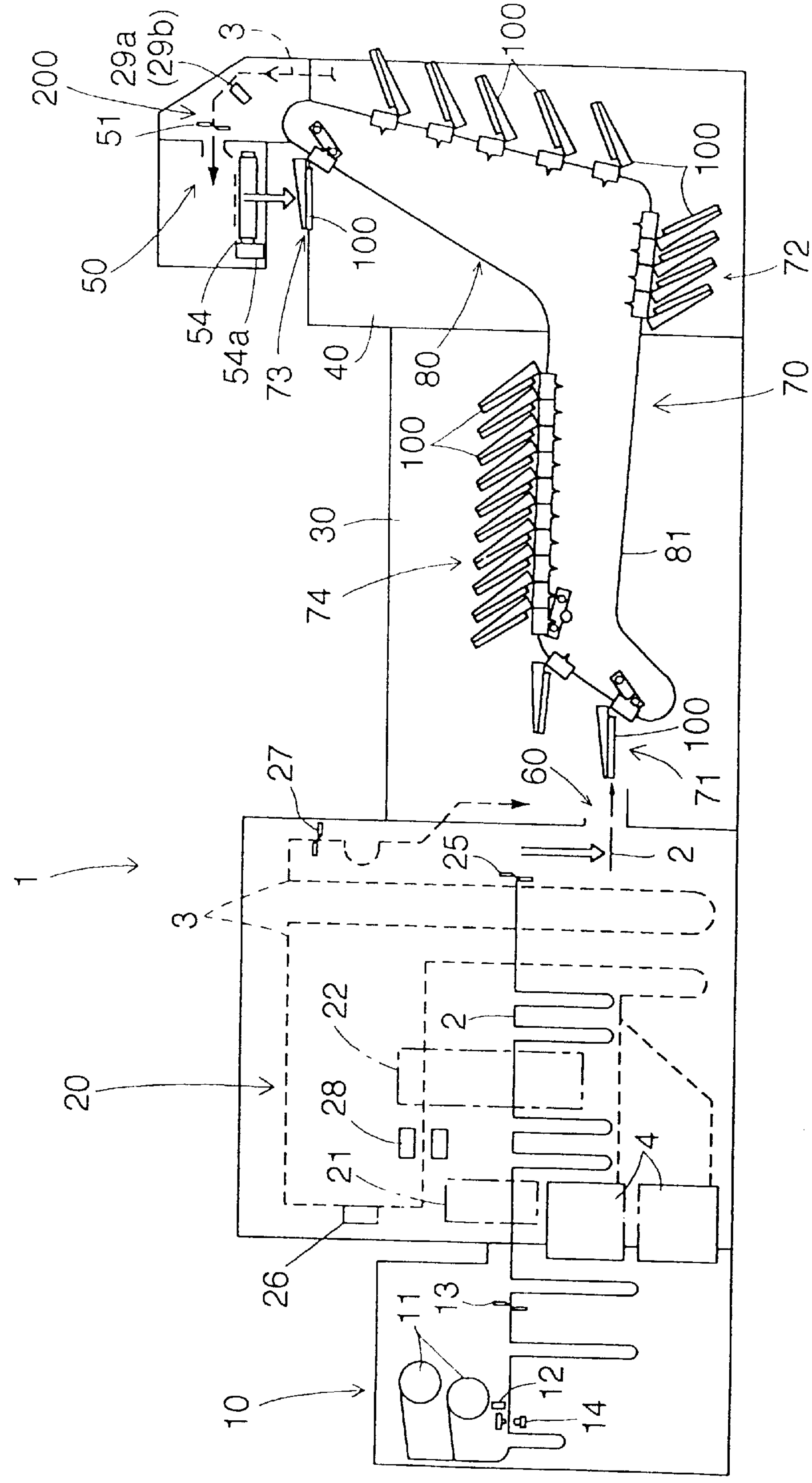
FIG. 2 is a schematic view of the photographic processing apparatus showing flows of negative films and printing paper in the apparatus of FIG. 1.

FIG. 1 shows an entire photographic processing apparatus 1 having a printing paper information reading apparatus according to this invention. FIG. 2 schematically shows transport paths of a negative film 2 (the term negative film being used herein to refer collectively to a negative film having a length of one photographic film, cut piece negatives each having several frames, and a negative film in a cartridge designed for an advanced photo system) and printing paper 3 undergoing varied processes in the photographic processing apparatus 1. This photographic processing apparatus 1 includes a negative film feeder 10, an exposing section 20 for printing images of the negative film 2 on the printing paper 3 drawn from a paper magazine 4, a developing section 30 for developing the exposed printing paper 3, a drying section 40 for drying the developed printing paper 3, a print outlet 50 for cutting and discharging the dried printing paper 3 in predetermined lengths as prints, a negative film outlet 60 for cutting and discharging the negative film 2 used in the exposing section 20, with negative sheets inserted as necessary, and a conveyer mechanism 70 for collating and combining, as a finished product, the cut negative films 2 in one unit (which may be regarded as one order to facilitate understanding) received from the negative film outlet 60 and the prints in the one unit received from the print outlet 50, and transporting the finished product to a position for collection by the operator.

The negative film feeder 10 may be loaded with two negative reels 11 each having up to 100 negative films 2 connected by splicing tape. A bar-code reader 12 reads film numbers and other information relating to photographic processing from bar codes on the negative films 2 drawn from either negative reel 11. A negative cutter 13 cuts the negative films 2 order by order. An image sensor 14 for checking frame images on the negative films 2.

Figure 3:
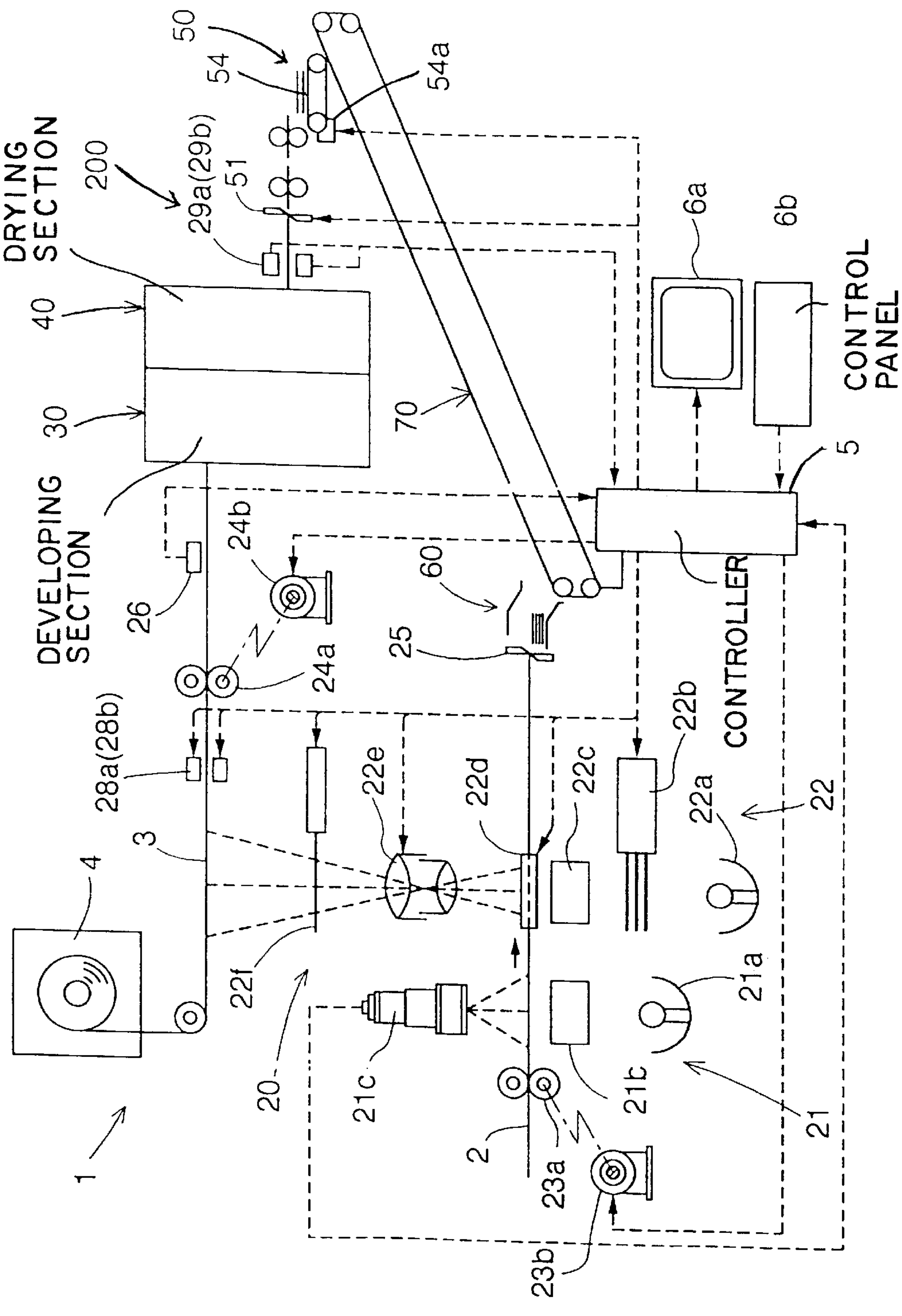
FIG. 3 is a block diagram of the photographic processing apparatus shown in FIG. 1.

As shown in FIG. 3 (in which the vertical arrangement of negative film 2 and printing paper 3 is inverted from FIG. 2), the exposing section 20 includes a film reader 21 disposed upstream with respect to a direction of film transport and having a reading light source 21*a*, a mirror tunnel 21*b* and an image pickup 21*c*, and an exposing device 22 disposed downstream with respect to the film transport direction and having an exposing light source 22*a*, a light adjustment filter 22*b*, a mirror tunnel 22*c*, a negative mask 22*d*, a printing lens 22*e* and a shutter 22*f*. Rollers 23*a* and a motor 23*b* for driving the rollers 23*a* are provided to transport the negative film 2 from the negative film feeder 10 through the exposing section 20 to the negative outlet 60.

Figure 4:
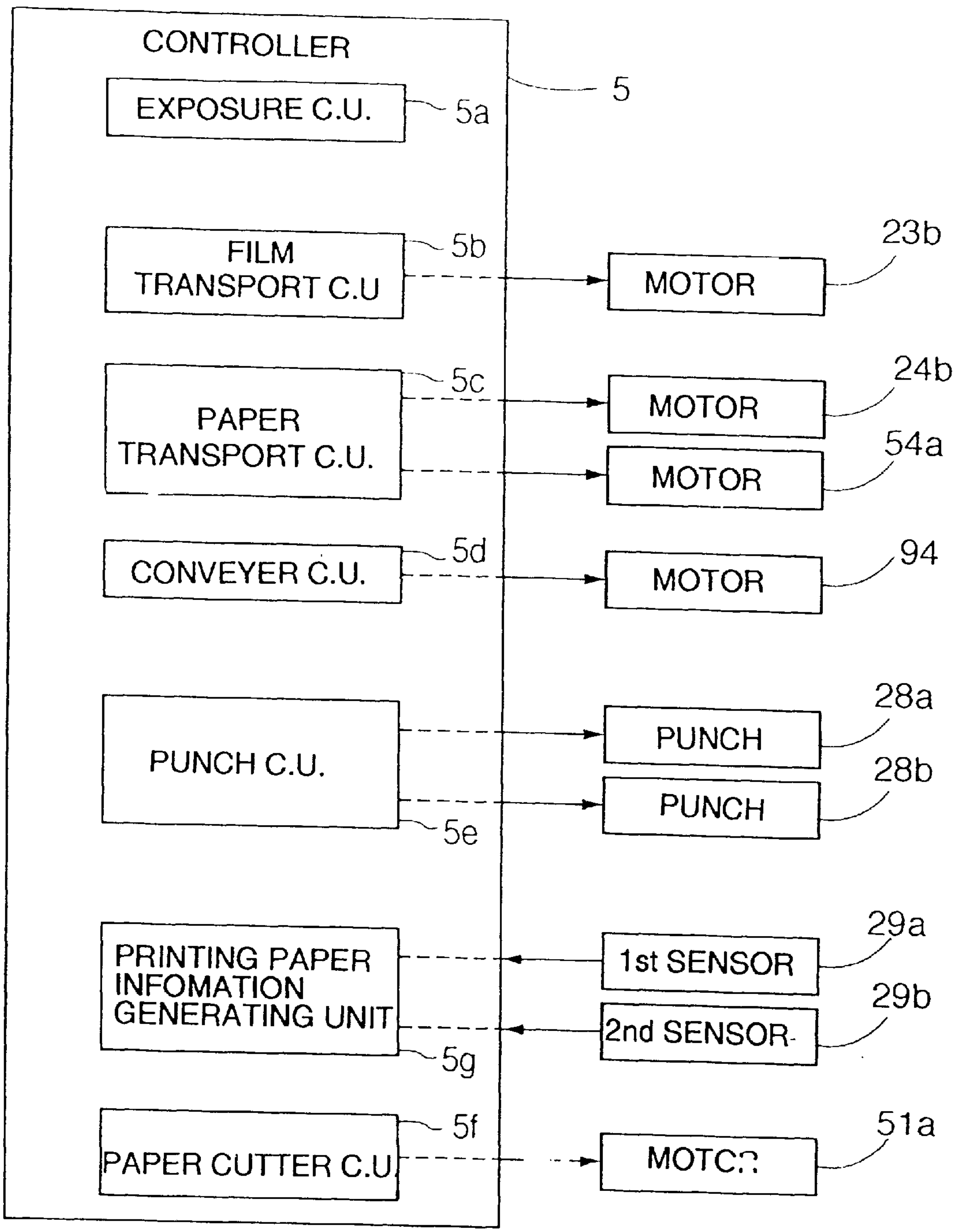
FIG. 4 is a block diagram of a controller.

First, the film reader 21 reads the image of each frame on the negative film 2 transported by the rollers 23*a*, and transmits image information to a controller 5 which is illustrated in detail in the block diagram of FIG. 4. From the image information received from the film reader 21, an exposure control unit 5*a* of the controller 5 derives exposing conditions for printing the images of the negative film 2 on the printing paper 3. The exposure control unit 5*a* controls the light adjustment filter 22*b* and shutter 22*f* based on the exposing conditions derived to exposed the printing paper 3 when the corresponding frame on the negative film 2 arrives at the position of negative mask 22*d*. In addition, the controller 5 processes the image information of the negative film 2 read by the film reader 21, and causes a monitor 6*a* to display simulations of images to be printed on the printing paper 3 with the exposing conditions derived. The operator may observe the simulated images displayed on the monitor 6*a*, and correct the exposing conditions through a control panel 6*b* as necessary.

The negative film 2 emerging from the exposing section 20 is cut to a plurality of negative pieces 2 each having six or four frames by a negative cutter 25 in the negative outlet 60 disposed downstream of the exposing device 22 with respect to the film transport direction. The negative pieces 2 are delivered to the conveyer mechanism 70. Depending on specifications, the negative pieces 2 may be inserted into negative sheets by a negative inserter not shown, the negative sheets being folded before delivery to the conveyer mechanism 70. The negative film 2 designed for an advanced photo system is drawn out of the cartridge before the varied processes, and rewound into the cartridge again after the processes. This type of negative film 2 after the exposing process is delivered to the conveyer mechanism 70 as contained in the cartridge. The negative film 2 is drawn from the negative reel 11 and ultimately transported to the conveyer mechanism 70 under control of a negative film transport control unit 5*b* of the controller 5.

The printing paper 3, with the images of the negative film 2 printed thereon in the exposing section 20, is transported by rollers 24*a* and a motor 24*b* for driving the rollers 24*a*, through a first punch 28*a* and a second punch 28*b* acting as a mark forming device for forming punch holes in the printing paper, and a correction print unit 26, and successively through developing tanks in the developing section 30 to be developed. The developed printing paper 3 is dried in the drying section 40, transported through a printing paper information reader 200, cut by a paper cutter 51 to become prints 3, and passed on to a transverse conveyer 53 driven by a motor 54*a*. A cutter 27 is disposed upstream of the developing section 30 for cutting the printing paper 3 in an emergency, e.g. when the printing paper 3 cannot be fed continuously from the exposing section 20 to the developing section 30 despite the presence of a loop. The series of operations for transporting the printing paper 3 drawn from the paper magazine 4, through the developing section 30, drying section 40 and transverse conveyer 54 to the conveyer mechanism 70 is controlled by a paper transport control unit 5*c* of the controller 5. The construction and operation of the conveyer mechanism 70 will be described in detail later, and the control thereof is effected by a conveyer control unit 5*d* of the controller 5.

Figure 5:
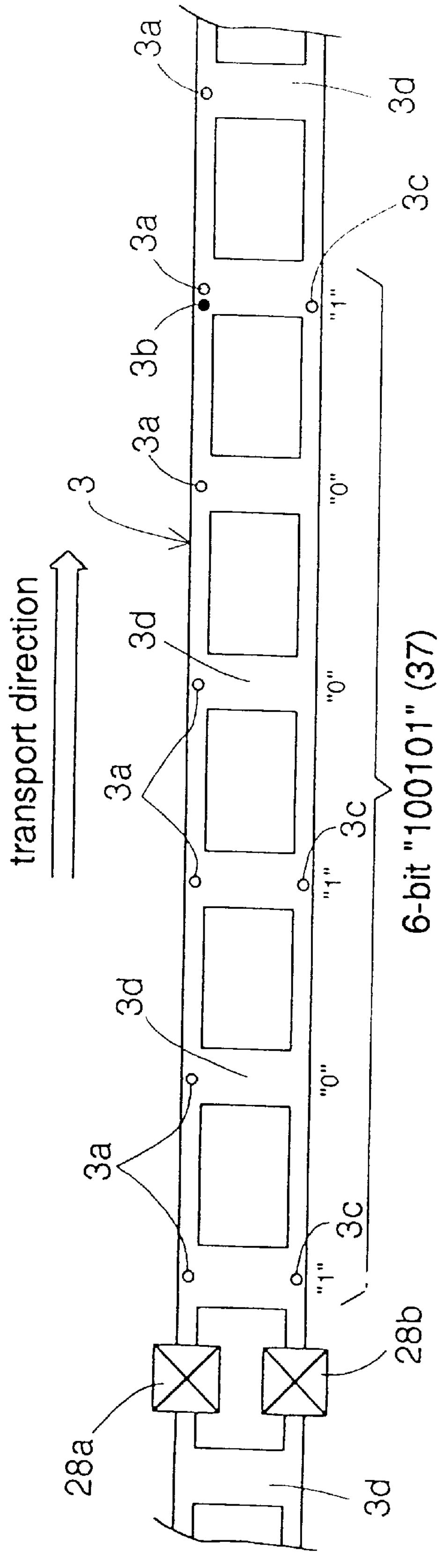
FIG. 5 is an explanatory view of a first and a second punches.

As shown in FIG. 5, the first punch 28*a* and second punch 28*b* are opposed to each other across the printing paper 3.

The first punch 28*a* forms punch holes representing cut marks 3*a* and order marks 3*b* along one side edge of printing paper 3. The second punch 28*b* forms punch holes representing information marks 3*c* along the other side edge of printing paper 3. The punches 28*a* and 28*b* have a known construction per se to form the punch holes in the printing paper 3 on instructions from a punch control unit 5*e* of the controller 5. The punch control unit 5*e* determines timing of the center of each blank 3*d* between the frame image of printing paper 3 passing through the first punch 28*a*, from size data of the frame images printed on the printing paper 3 and transport data of the printing paper 3, and instructs the first punch 28*a* to form the cut marks 3*a*. Further the punch control unit 5*e* instructs the first punch 28*a* to form an order mark 3*b* when the first image frame in each order passes through the first punch 28*a*, in the blank 3*d* immediately preceding the first image frame and in a position slightly forward of where a cut mark is to be formed. As a result, as shown in FIG. 5, the order mark 3*b* and cut mark 3*a* are arranged with a slight space therebetween.

In addition, the punch control unit 5*e* causes the second punch 28*b* to apply the information marks 3*c* to six edge positions opposed to the respective cut marks 3*a*, starting with an edge position opposed to the cut mark 3*a* arranged with the order mark 3*b*, thereby recording information in six bits. Where a punch hole is formed by the second punch 28*b*, information mark 3*c* is regarded as "1". Where no punch hole is not formed, information mark 3*c* is regarded as "0". In FIG. 5, for example, information marks 3*c* are arranged in the order of "1", "0", "0", "1", "0" and "1" in the direction of transport, which represent a binary number 100101 (or a decimal number 37). In this embodiment, these information marks 3*c* indicates an order number. When order numbers successively generated by the controller 5 are applied to the punch control unit 5*e*, the punch control unit 5*e* gives instructions to the second punch 28*b* to form information marks 3*c* corresponding to the order numbers.

Figure 6:
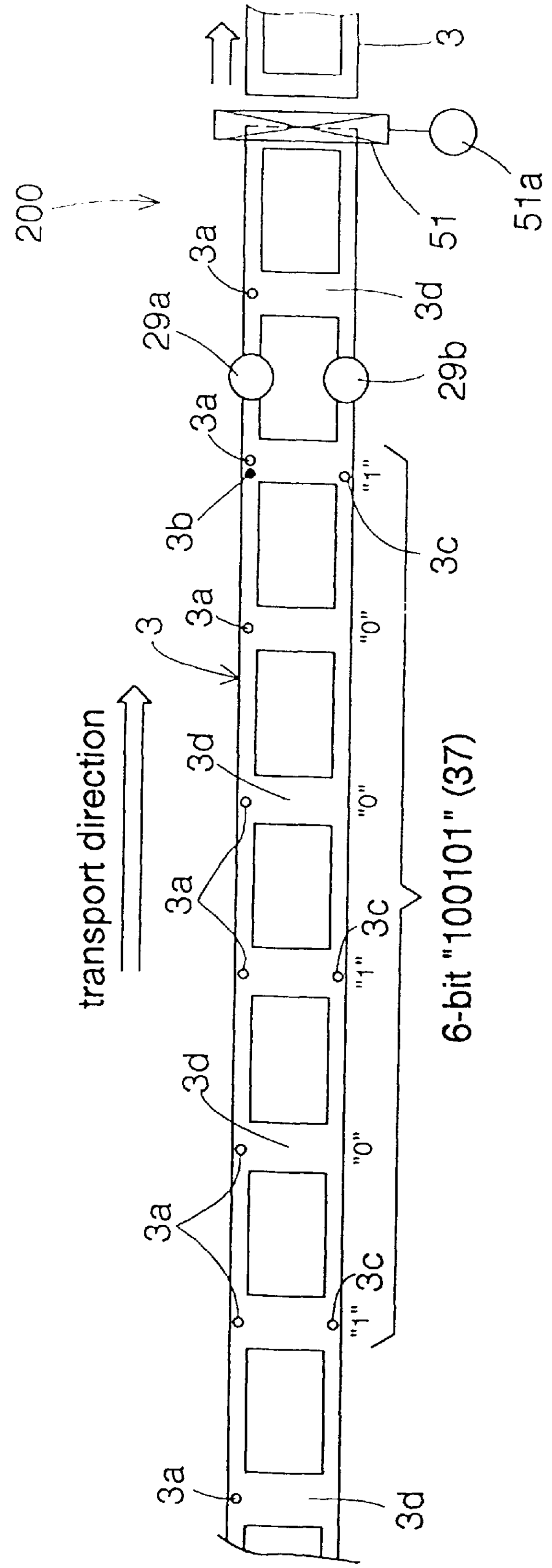
FIG. 6 is an explanatory view of a first and a second mark detectors.

As shown in FIG. 6, upstream of the paper cutter 51 with respect to the direction of transport are a first optical sensor 29*a* and a second optical sensor 29*b* are opposed to each other across the printing paper 3. The first optical sensor 29*a* acts as a first mark detecting device for detecting the cut marks 3*a* and order marks 3*b*. The second optical sensor 29*b* acts as a second mark detecting device for detecting the information marks 3*c*. The first sensor 29*a* and second sensor 29*b* transmits detection signals to the controller 5 for use in controlling operation of a motor 61*a* for driving the paper cutter 51, in detecting order changes for controlling the conveyer mechanism, and in detecting the order numbers. In particular, detection signals of the cut marks 3*a* are used by a paper cutter control unit 5*f* of the controller 5, detection signals of the order marks 3*b* by the conveyer control unit 5*d*, and detection signals of the cut marks 3*a*, order marks 3*b* and information marks 3*c* by a printing paper information generating means 5*g*. Each order number read is used in an operation for collating the negative film 2 and prints 3. In this embodiment, the printing paper information reader 200 basically is formed of the first sensor 29*a*, the second sensor 29*b*, and the printing paper information generation means 5*g*, in particular, of the controller 5.

Figure 7:
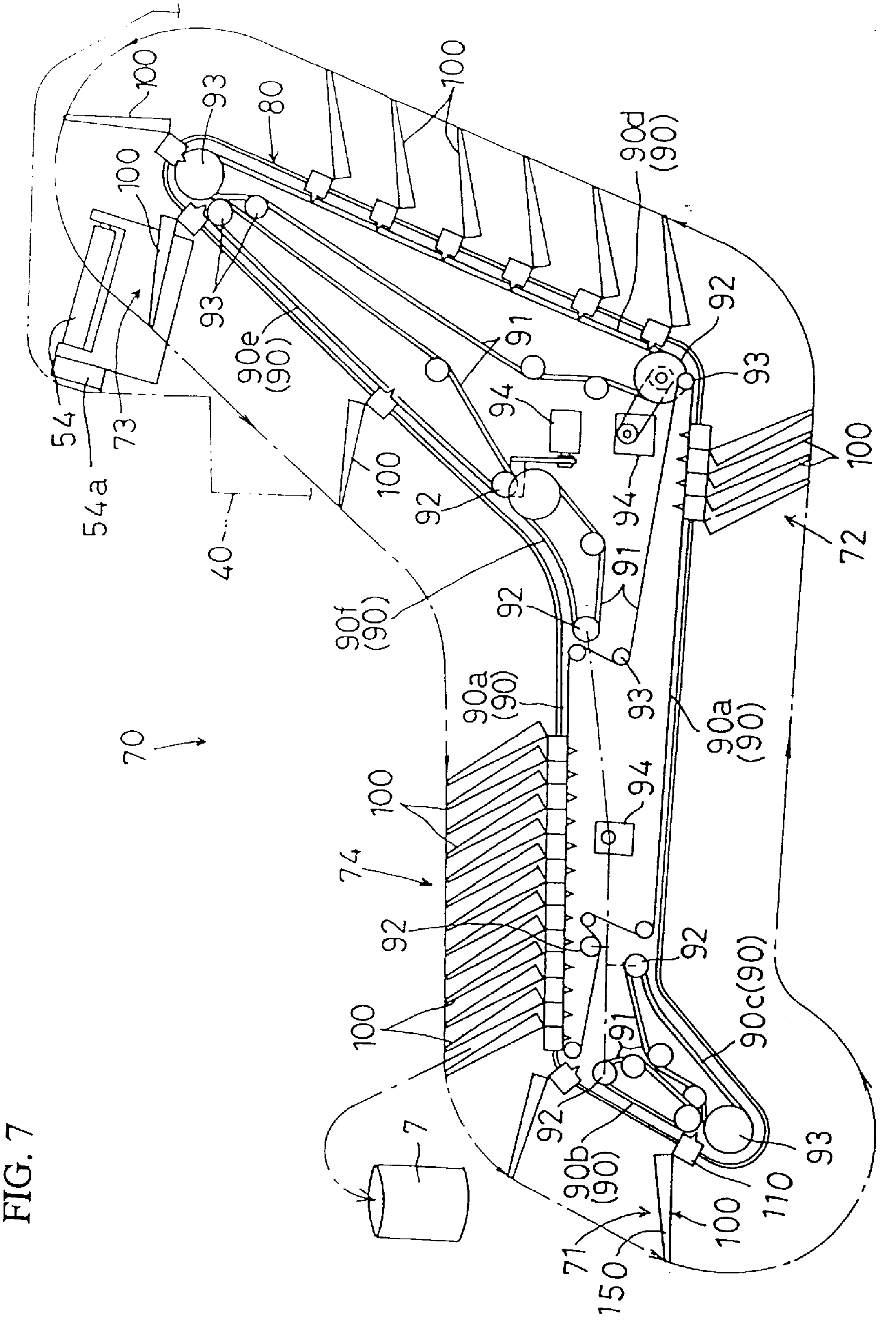
FIG. 7 is a schematic view of a conveyer mechanism forming a photograph collating system.

As shown in FIG. 7, the conveyer mechanism 70 is the tray conveyer type including a plurality of trays 100 driven by a drive device 90 to move along a guide circuit 80. A transport line provided by the guide circuit 80 includes a negative film intake station 71 for receiving negative films 2 from the negative film outlet 60 disposed in a lower position of the photographic processing apparatus 1, a standby station 72, a print intake station 73 for receiving prints 3 from the print outlet 50 disposed in an upper position of the photographic processing apparatus 1, and a collating station 74 for collating the negative films 2 and prints 3 in each order.

Figure 8:
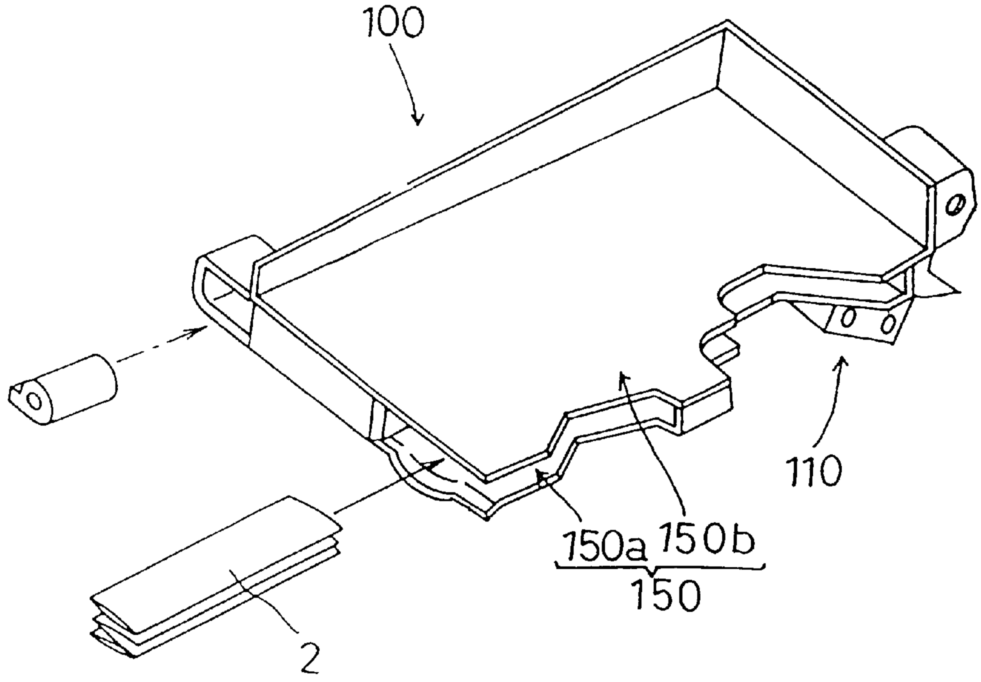
FIG. 8 is a perspective view of a tray.

The guide circuit 80 is formed of a pair of right and left rails having an approximately circular section and a connector interconnecting the rails with a predetermined spacing therebetween. Each tray 100 includes a running device 110 for running on the rails, and a carrier 150 mounted on the running device 110. As shown in FIG. 8, the carrier 150 has a film holder 150*a* and a print holder 150*b*.

The trays 100 are transported by the drive device 90 which is the chain drive type employing chains 91 as endless drive elements. As seen from FIG. 7, the drive device 90 is divided into a first to a sixth drive units 90*a*–90*f*. The first drive unit 90*a* extends between the collating station 74 and standby station 72. The second drive unit 90*b* is arranged to move emptied trays 100 to a tray stopping position in the negative intake station 72. The third drive unit 90*c* is arranged to move the trays 100 loaded with the negative films 2 to a storage line at the standby station 72 defined partly by the first drive unit 90*a*. The fourth drive unit 90*d* is arranged to move the trays 100 stored in the standby station 72 successively to a tray stopping position in the print intake station 73. The fourth drive unit 90*d* moves the trays 100 up a steep slope. The fifth drive unit 90*e* moves the trays 100 additionally loaded with prints 3 down a steep slope to a portion of the first drive unit 90*a* forming the collating station 74. Since the guide circuit 80 is curved upstream of the collating station 74, the sixth drive unit 90*f* is disposed between the fifth drive unit 90*e* and the first drive unit 90*a* to move the trays 100 along the curved line. Each of the above drive units includes a chain 91, a drive sprocket 92 and direction changing sprockets 93 engaging the chain 91, and a drive motor 94 for driving the drive sprocket 92. The first, second, third and sixth drive units 90*a*, 90*b*, 90*c* and 90*f* receive power from a common drive motor 94. The fourth and fifth drive units 90*d* and 90*e* must operate intermittently in a timed way, and therefore receive power from individual drive motors 94, respectively. Each chain 91 includes pulling link plates defining hitches arranged at predetermined intervals and extending axially of the rollers. Each, chain 91 moves the trays 100 by means of these hitches. The drive motors 94 are controlled by the conveyer control unit 5*d* of the controller 5 in a coordinated way.

Figure 9:
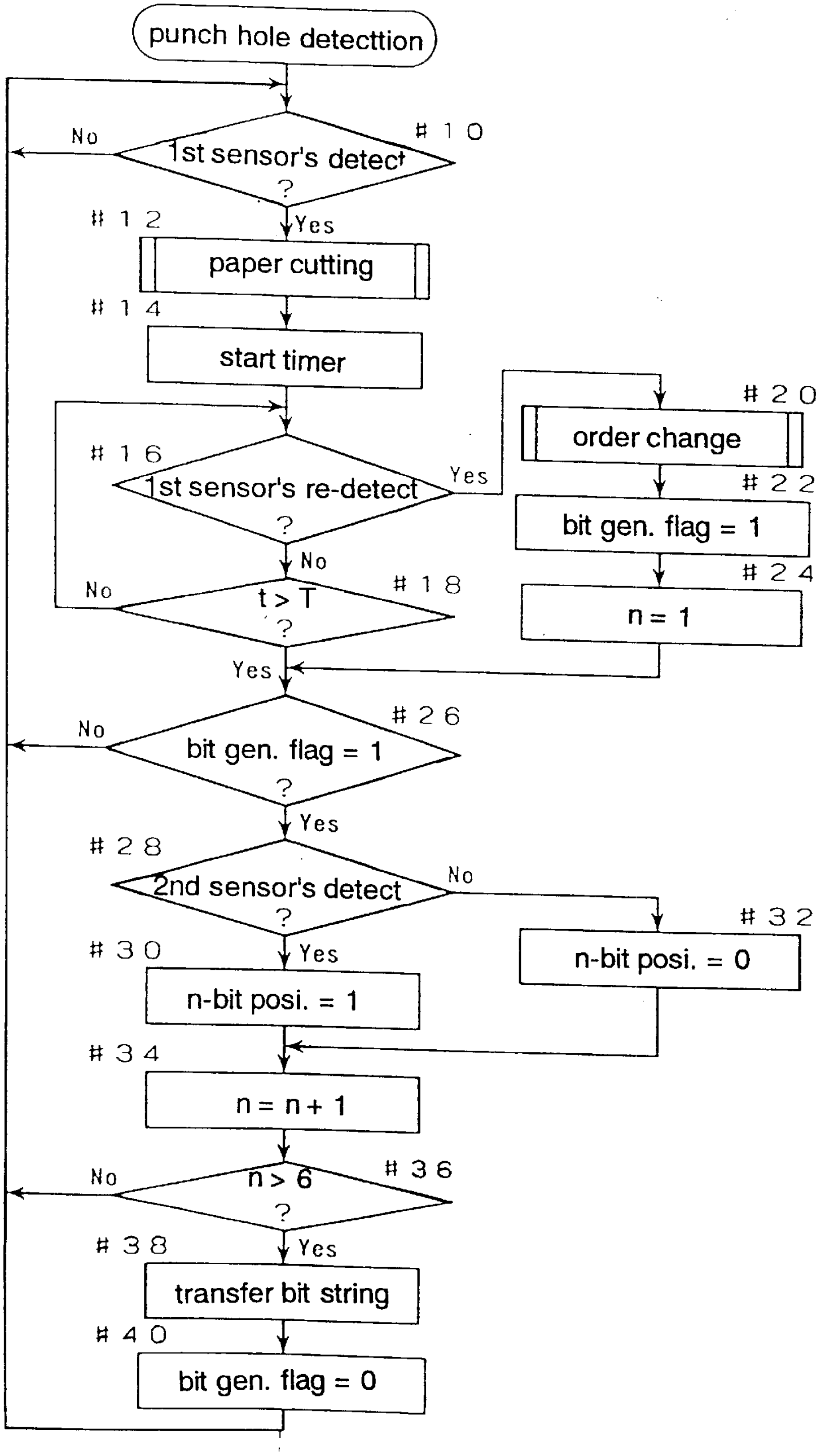
FIG. 9 is a flowchart of an operation of the controller for detecting punch holes.
Figure 10:
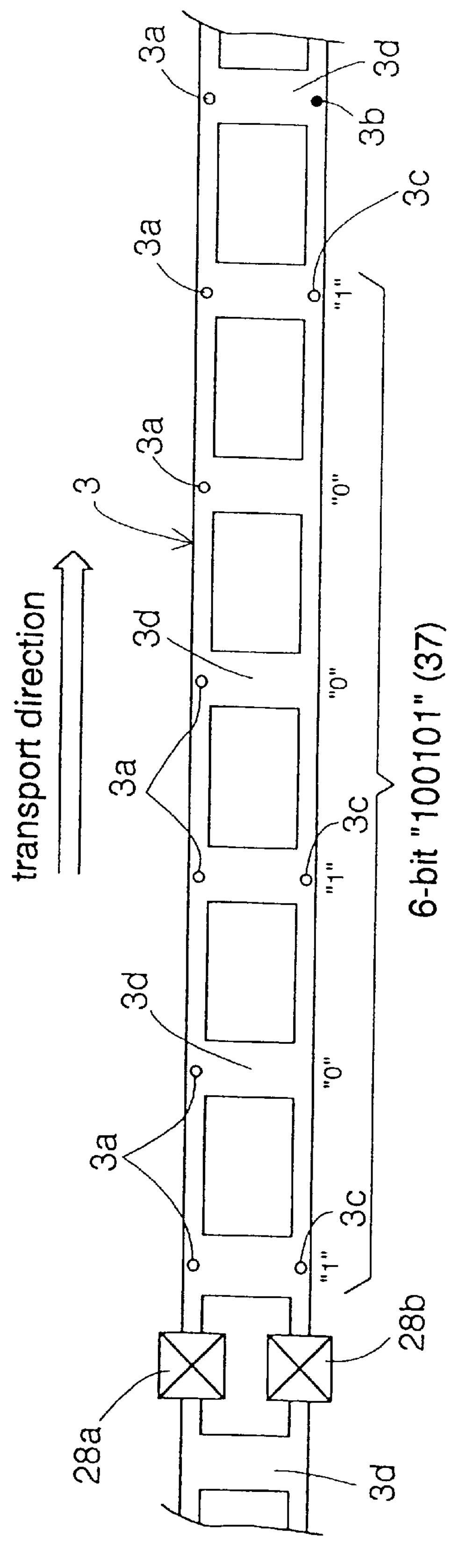
FIG. 10 is an explanatory view of punched printing paper in a modified embodiment.

An operation of the paper cutter 51, detection of order changes and reading of order numbers will be described with reference to the flowchart shown in FIG. 9. These operations are based on the detection of punch holes 3*a*, 3*b* and 3*c* by the first sensor 29*a* and second sensor 29*b*.

When this routine is started, "0" is set to a bit generation flag indicating generation of order numbers. First, the operation waits for the first sensor 29*a* to detect a cut mark 3*a* in the form of a punch hole (#10). When a cut mark 3*a* is detected, the paper cutter control unit 5*f* is prompted to operate the paper cutter 51 (#12), and a timer is started at the same time (#14). Further, checking is made whether the first censor 29*a* has detected a punch hole again, i.e. an order mark 3*b* (#16). If the result is "No", checking is made whether time t measured by the timer has passed a predetermined time T (#18). Unless the predetermined time T is passed, the operation waits for the first sensor 29*a* to detect a next punch hole, i.e. an order mark 3*b*. This predetermined time T is set as a time required for the first sensor 29*a* to detect an order mark 3*b* after detection of a cut mark 3*a*. That is, if the first sensor 29*a* detects two punch holes within the predetermined time T, it means that an order mark 3*b* and a cut mark 3*a* are detected. A confirmation is thereby made that the orders are changed and the information marks representing an order number start at this blank 3*d*. Thus, if the first sensor 29*a* detects a next punch hole, i.e. an order mark 3*b*, within the predetermined time T (#16), the controller 5 is requested to execute a process based on an order change (#20), and "1" is set to the bit generation flag indicating generation of an order number (#22). Further, "1" is substituted for variable: n as initialization of order number generation (#24). The variable: n shows a bit position in the 6-bit order number generated. Step #26 is executed to check whether "1" is set to the bit generation flag, i.e. whether an order number is being generated or not. If the result is "Yes", checking is made whether the second sensor 29*b* is detecting information marks 3*c* (#28). If a punch hole 3*b* (or information mark 3*c*) is detected, it is determined that n-bit position is "1" in the binary number (#30). If a punch hole 3*b* (or information mark 3*c*) is not detected, it is determined that n-bit position is "0" in the binary number (#32). In any case, when the value of n-bit position has been determined, the variable: n is incremented (#34), and it is checked if the new variable value exceeds 6 (#36). If the new variable value has not reached 6, the operation returns to step #10 for reading of a next value of bit position. The new variable value reaching 6 indicates that an order number has been generated. The order number obtained, which is expressed by a 6-bit binary number, is forwarded to a work area of the controller (#38), to be linked to the ID code of negative film 2 and the ID code of a tray 100, or to access a link table linking these ID codes in order to check a state of collation. When an order number has been generated, "0" is set to the bit generation flag (#40), and the operation returns to step #10 for reading of a next order number. When "No" results from step #26, this indicates merely an instruction to cut the paper, and so the operation returns to step #10.

Figure 11:
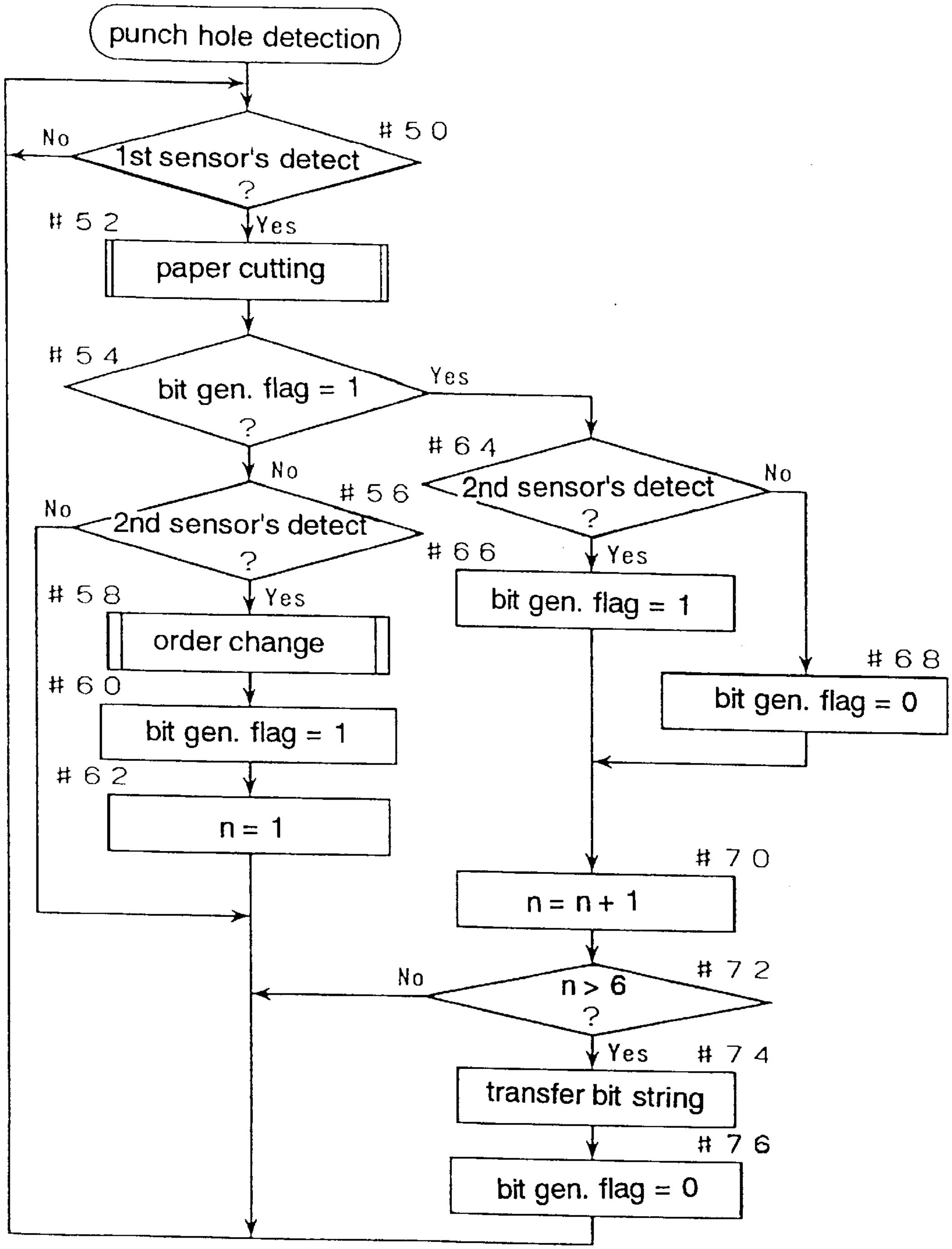
FIG. 11 is a flowchart of an operation of the controller for detecting punch holes in the printing paper shown in FIG. 10.

In the above embodiment, the order marks 3*b* are formed along the side edge where the cut marks 3*a* are formed. It is possible to form the order marks 3*b* along the same side edge where the information mark 3*c* are formed, In the arrangement of the respective marks 3*a*, 3*b* and 3*c*, the cut marks are formed along one side edge of printing paper 3, while the order marks 3*b* and information marks 3*c* are formed along the other side edge of printing paper 3. In this arrangement, each order mark 3*b* is used as a leading mark, and the six succeeding blanks 3*d* are used for information marks 3*c*. In other words, the information marks 3*c* start at the blank between the first frame image and the next frame image in a new order. An operation of the paper cutter 51, detection of order changes and reading of order numbers will be described in relation to the printing paper 3 having the above arrangement, with reference to the flowchart shown in FIG. 11. Here again, these operations are based on the detection of punch holes 3*a*, 3*b* and 3*c* by the first sensor 29*a* and second sensor 29*b*.

When this routine is started, "0" is set to the bit generation flag indicating generation of order numbers. First, the operation waits for the first sensor 29*a* to detect a cut mark 3*a* (#50). When a cut mark 3*a* is detected, the paper cutter control unit 5*f* is prompted to operate the paper cutter 51 (#52). Checking is made whether "1" is set to the bit generation flag, i.e. whether an order number is being generated or not (#54). Since "0" is set at first, the result is "No", and checking is made whether the second sensor 29*b* is detecting an order mark 3*b* (#56). If an order mark 3*b* is detected, the controller 5 is requested to execute a process based on an order change (#58), and "1" is set to the bit generation flag indicating generation of an order number (#60). Further, "1" is substituted for variable: n (#62). If an order mark 3*b* is not detected at step #56, this indicates merely an instruction to cut the paper, and so the operation returns to step #50. If it is found at step #54 that "1" has been set to the bit generation flag, i.e. an order number is being generated, checking is made whether the second sensor 29*b* is detecting information marks 3*c* (#64). If a punch hole 3*b* (or information mark 3*c*) is detected, it is determined that n-bit position is "1" in the binary number (#66). If a punch hole 3*b* (or information mark 3*c*) is not detected, it is determined that n-bit position is "0" in the binary number (#68). In any case, when the value of n-bit position has been determined, the variable: n is incremented (#70), and it is checked if the new variable value exceeds 6 (#72). If the new variable value has not reached 6, the operation returns to step #50 for reading of a next value of bit position. The new variable value reaching 6 indicates that an order number has been generated. The order number obtained, which is expressed by a 6-bit binary number, is forwarded to the work area of the controller (#74). Since an order number has been generated, "0" is set to the bit generation flag (#76), and the operation returns to step #50 for reading of a next order number.

In the foregoing embodiments, the number of frame images in one unit or in one order (more precisely the number of blanks 3*d*) must exceed what is needed for the information marks. Since the order numbers are in serial numbers, when one order includes an insufficient number of frame images, the information marks for that order may be disregarded, and an order number may be determined from the order number based on preceding information marks and that based on succeeding information marks.

In the foregoing embodiments, the cut marks 3*a* and information marks 3*c* are arranged along the opposite side edges of printing paper 3. All of these marks may be arranged along one side edge if the questions of space and detection are cleared. The marks may be in the form of notches or printed marks instead of being punch holes.

What is claimed is:

1. A printing paper information reading apparatus for reading information represented by marks formed for each frame image printed on printing paper, comprising:

first mark detecting means for detecting cut marks formed in said printing paper, said cut marks being formed at identical portions of the respective frame images in a width direction of the printing paper;

order mark detecting means for detecting order marks formed in said printing paper separately from said cut marks;

second mark detecting means for detecting information marks formed in said printing paper in a corresponding relationship to said cut marks, said information marks being formed separately from said cut marks and said order marks, said information marks indicting order numbers respectively; and printing paper information generating means for generating paining paper information by evaluation results of detection by said information marks by said second mark detecting means in synchronism with detection of said cut marks by said first detecting means.

2. The apparatus according to claim 1, wherein each said cut mark is formed along one side edge of the printing paper; each said information mark is formed along the other side edge of the printing paper; and said order mark is formed along said one side edge of the printing paper with a slight space from said cut mark.

3. The apparatus according to claim 1 wherein said first mark detecting means is also said order mark detecting means.

4. The apparatus according to claim 1, wherein said first mark detecting means and said second mark detecting means are disposed in opposition to each other across said printing paper.

5. The apparatus of claim 1, wherein said information marks comprise at least six bits of information provided over a predetermined number of image frames included in one order; and said printing paper information generating means determines the order number of an order not including said predetermined number of image frames based on the information marks provided for the image frames or orders adjacent thereto.

6. A printing paper information reading apparatus for reading information represented by marks formed for each frame image printed on printing paper, comprising:

first mark detecting means for detecting cut marks formed in said printing paper, said cut marks being formed at identical portions of the respective frame images in a width direction of the printing paper;

second mark detecting means for detecting information marks formed in said printing paper in a corresponding relationship to and separately from said cut marks, said information marks indicating order numbers respectively; and printing paper information generating means for generating printing paper information by evaluating results of detection by said information marks by said second mark detecting means in synchronism with detection of said cut marks by said first detecting means;

wherein said information marks comprise at least six bits of information provided over a predetermined number of image frames included in one order; and said printing paper information generating means determines the order number of an order not including said predetermined number of image frames based on the information marks provided for the image frames of orders adjacent thereto.

* * * * *

UNITED STATES PATENT AND TRADEMARK OFFICE

CERTIFICATE OF CORRECTION

PATENT NO. : 6,160,609
DATED : December 12, 2000
INVENTOR(S) : Takatoshi Inoue

It is certified that error appears in the above-identified patent and that said Letters Patent is hereby corrected as shown below:

Column 5,
Line 47, change “61a” to -- 51a --.

Column 6,
Line 42, after “,” delete -- Each --.
Line 59, change “censor” to -- sensor --.

Signed and Sealed this

Twentieth Day of July, 2004

JON W. DUDAS
*Acting Director of the United States Patent and Trademark Office*